(12) United States Patent
Nomoto et al.

(10) Patent No.: US 8,511,454 B2
(45) Date of Patent: Aug. 20, 2013

(54) ELLIPTIC RUBBER STOPPER SUPPLY METHOD AND ELLIPTIC RUBBER STOPPER SUPPLY DEVICE

(75) Inventors: Yoshiaki Nomoto, Shizuoka (JP); Kanji Ishigure, Gifu (JP)

(73) Assignees: Yazaki Corporation, Tokyo (JP); Asahi Seiki Co., Ltd., Gifu-shi (JP)

( * ) Notice: Subject to any disclaimer, the term of this patent is extended or adjusted under 35 U.S.C. 154(b) by 854 days.

(21) Appl. No.: 12/458,929

(22) Filed: Jul. 28, 2009

(65) Prior Publication Data

US 2010/0028125 A1   Feb. 4, 2010

(30) Foreign Application Priority Data

Jul. 29, 2008  (JP) ................................ 2008-194872

(51) Int. Cl.
*B65G 65/30* (2006.01)
(52) U.S. Cl.
USPC ............................. 193/11; 414/808; 414/16
(58) Field of Classification Search
None
See application file for complete search history.

(56) References Cited

U.S. PATENT DOCUMENTS 5,447,077 A * 9/1995 Lautenschlager .......... 73/863.11

FOREIGN PATENT DOCUMENTS

| JP | 05-294436 A | 11/1993 |
| JP | 06-032424 A | 2/1994 |
| JP | 2004-103492 A | 4/2004 |
| JP | 2004281295 A * | 10/2004 |

* cited by examiner

*Primary Examiner* — Kavel Singh
(74) *Attorney, Agent, or Firm* — Edwards Wildman Palmer LLP

(57) ABSTRACT

The present invention is to provide an elliptic rubber stopper supply method and device thereof, which can smoothly and steadily supply an elliptic rubber stopper to an assembling side of a rubber stopper without blocking a supply route with the rubber stopper. The elliptic rubber stopper supply device sprays alternately a gas on a rubber stopper, matches a minor axial direction of the rubber stopper to a spraying direction of the gas, and inserts the rubber stopper into an elliptic first hole in that condition. Also, the device includes first shape corrective portion for correcting a shape of the rubber stopper. The first shape corrective portion has a rubber stopper receiving portion and a pair of air outlets for spraying alternately a gas on both side surfaces of the rubber stopper. One of the air outlets is arranged on the one side of the rubber stopper receiving portion, the other is arranged on the other side thereof. Each the air outlet is offset in a rubber stopper axial direction and located.

5 Claims, 6 Drawing Sheets

ELLIPTIC RUBBER STOPPER SUPPLY METHOD AND ELLIPTIC RUBBER STOPPER SUPPLY DEVICE

The priority application Number Japan Patent Application No. 2008-194872 upon which this patent application is based is hereby incorporated by reference.

BACKGROUND OF THE INVENTION

1. Filed of the Invention

The present invention relates to an elliptic rubber stopper supply method and device thereof, which corrects a shape (direction) of a rubber stopper at a certain shape and supply. For example, the elliptic rubber stopper supply method and device thereof is performed before a process inserting the electric rubber stopper into an electric wire. The electric rubber stopper prevents water from entering into a terminal receiving chamber of a connector.

2. Description of the Related Art

FIG. 8 shows an embodiment of conventional rubber stopper supply device (patent document 1). The rubber stopper 52 is attached to an insulating coating of an electric wire (not shown), and blocks an entrance of a receiving chamber in a connector housing (not shown). Thereby, the rubber stopper 52 prevents water from entering into the terminal receiving chamber.

The rubber stopper supply device 51 has a cylindrical clear drum 53 receiving a rubber stopper, a turntable 55 and an alignment feeder 57. The turntable 55 is arranged inside a bottom portion of the drum 53, and includes a groove 54 for receiving a plurality of rubber stoppers in the outer circumference. The alignment feeder 57 is arranged on an outer circumference of the turntable 55.

A plurality of rubber stoppers 52 are received in the drum 53. The turntable 55 is rotary driven in a direction of an arrow B at a central axis. A rubber stopper 52 arranged on the turntable 55 moves to the outer circumference side with centrifugal force, and falls into the groove 54. Furthermore, a small diameter 52a of the rubber stopper 52 goes into a downside guide groove (not shown) downward, and a large diameter 52b engages with the groove 54. A longitudinal section of the groove 54 and the guide groove are formed of T-shaped. In this condition, the rubber stopper 52 moves to a feed opening 56 of the rubber stopper along the guide groove, and is discharged from the feed opening 56 to an outside. The rubber stopper 52, which goes into the groove 54 in a condition keeping the small diameter 52a side up, interferes with an end face of a guide plate 58. As a result, approach to the guide groove is prevented, and led into another discharge groove (not shown).

The above mentioned device relates to supply of the rubber stopper. However, there is a supply method of goods except the rubber stopper. For example, in the patent document 2 (not shown), a supply method is described. In the supply method, first, a solid body (chip) is fallen into a perpendicular supply tube. Next, the solid body is inserted into a square hole from an inclined surface of a bottom portion of the supply tube and a shape of the solid body is controlled. And then, in the shape thereof, the solid body is fallen into a hole for loading the chip.

In the patent document 3 (not shown), a cap of a container (consist of a large diameter and a small diameter) is passed into a transfer route. The cap is transmitted along the transfer route which changes its shape according to a guide body of the transfer route, a side guide thereof and a stepped guide portion thereof. Thereby, finally, position of the cap can be controlled in regulation state.

However, in the above conventional supply method of the rubber stopper and goods, the elliptic rubber stopper based on a prescribed pitch of the terminal receiving chamber of the connector can be distinguished between a short diameter (minor axis) and a long diameter (major axis). Furthermore, the rubber stopper can not be supplied to an assembling side with a predefined shape. For this reason, there is a problem such that the elliptic rubber stopper is blocked with a supply route. In addition, smooth supply was not performed.

Also, the elliptic rubber stopper is an existing rubber stopper. The electric rubber stopper includes a small diameter (minor diameter) and a large diameter (major diameter). A cross section of the small diameter is formed into a round shape. Into the rubber stopper, an electric wire is inserted. A cross section of the large diameter is formed into an elliptic shape including an oval shape. The large diameter adheres tightly to an inner wall surface of the terminal receiving chamber of the connector housing.

Patent Document 1:
Japan published patent application No. 2004-103492 (FIG. 8)
Patent Document 2:
Japan published patent application No. H06-32424
Patent Document 3:
Japan published patent application No. H05-294436

SUMMARY OF THE INVENTION

Objects to be Solved

The present invention is to provide an elliptic rubber stopper supply method and device thereof, which can smoothly and steadily supply an elliptic rubber stopper to an assembling side of a rubber stopper without blocking a supply route with the rubber stopper.

An elliptic rubber stopper supply method comprising the steps of: spraying alternately a gas on a rubber stopper, of which cross section is formed into an elliptical shape, from both sides of a radial direction more than once in a rubber stopper receiving space of a rubber stopper supply route; matching a minor axial direction of the rubber stopper to a spraying direction of the gas; inserting the rubber stopper into an elliptic first hole connecting to the rubber stopper receiving space in the matching condition.

With the construction described above, an outer surface of a large area at a short diameter side of the rubber stopper rotates in the rubber stopper receiving space by receiving gas pressure. Furthermore, by the gas pressure from both sides in the radial direction of the rubber stopper, the minor axial direction of the rubber stopper is matched to the spraying direction of the gas. In that condition, the rubber stopper along the elliptic hole of the same shape falls down with self-weight or is supplied by the pressure of the gas. The rubber stopper supply route is connected to a hopper for storing the rubber stopper. "elliptical shape" or "elliptic" includes a oval shape and a rectangle shape.

According to a second aspect of the present invention, the rubber stopper is inserted into an elliptic second hole of a delivery table from the first hole, and transferred to an elliptic third hole of a discharge portion from the delivery table at a transfer portion.

With the construction described above, the rubber stopper is transferred from the first hole of the rubber stopper supply route to the second hole in the same direction with self-weight or gas pressure. And then, the delivery table moves, and the rubber stopper in the second hole is exposed. Furthermore, the rubber stopper is transferred to the third hole of the discharge portion in the same direction at the transfer portion. Finally, the rubber stopper is supplied from the discharge portion to next process. The transfer portion, as an example, sucks the rubber stopper and moves it in a horizontal directions and a vertical direction. Preferably, suction and discharge are performed. By pressure discharged, it is preferred that the rubber stopper is discharged from the discharge portion.

According to a third aspect of the present invention, the rubber stopper is transferred to an elliptic fourth hole of a reverse portion from the delivery table at the transfer portion, the rubber stopper is reversed in a rubber stopper axial direction, and the rubber stopper is transferred to the discharge portion at the transfer portion.

With the construction described above, a small diameter of a tip side in an axial direction of the rubber stopper and a large diameter of an end side are reversed as necessary at the reverse portion, and transferred to the transfer portion in inversion condition. By way of example, the reverse portion includes a rotatable rotor and a drive portion for driving the rotor.

According to a fourth aspect of the present invention, an elliptic rubber stopper supply device includes a first shape corrective portion correcting a shape of a rubber stopper of which cross section is formed into an elliptic shape. The first shape corrective portion includes a rubber stopper receiving portion arranged on the way of a rubber stopper supply route, and a pair of air outlets spraying alternately and intermittently a gas on both side surfaces of the rubber stopper. The rubber stopper receiving portion has a rectangular portion in one side and a semicircle portion in another side, the semicircle portion connecting to an elliptic hold of the rubber stopper supply route through a shoulder portion provided in a bottom side of the rubber stopper receiving portion. One of the air outlets is arranged on the one side of the rubber stopper receiving portion, the other is arranged on the other side thereof, and each the air outlet is offset in a rubber stopper axial direction and located.

With the construction described above, the gas is sprayed from opposed two directions in the rubber stopper receiving portion on the elliptic rubber stopper which supplied to the supply route is sprayed. Furthermore, an outer surface of a large area at a short diameter side of the rubber stopper rotates in the rubber stopper receiving portion by receiving gas pressure. By the gas pressure from both sides in the radial direction of the rubber stopper, the minor axial direction of the rubber stopper is matched to the spraying direction of the gas. In that condition, the rubber stopper along the elliptic hole of the same shape falls down with self-weight or is supplied by the pressure of the gas. In a condition that one of a long diameter of the rubber stopper abuts against the shoulder portion, supply of the rubber stopper is prevented. In addition, one of the short diameter of the rubber stopper abuts against an inner surface of the rectangular portion in the rubber stopper receiving portion, so that further rotation of the rubber stopper is prevented and transferred to the elliptic hole in that condition. Furthermore, by offsetting and locating a pair of the air outlets, interference of gas which is sprayed from each the air outlet is prevented. Thereby, shape correction of the rubber stopper can be smoothly and steadily performed.

According to a fifth aspect of the present invention, the elliptic rubber stopper supply device further includes a second shape corrective portion having a reverse portion reversing the rubber stopper in an axial direction.

With the construction described above, a small diameter of a tip side in an axial direction of the rubber stopper and a large diameter of an end side are reversed as necessary at the reverse portion. By way of example, the reverse portion includes a rotatable rotor and a drive portion for driving the rotor.

Effect of the Invention

According to the present invention, by spraying alternately gas from both sides of the rubber stopper on the rubber stopper, clogging the supply route with the rubber stopper can be prevented. Additionally, the rubber stopper can be smoothly and steadily supplied to an assembling side of the rubber stopper. Also, a direction of the rubber stopper is corrected only by gas without using a solid body such as a pin. Thereby, a function as a waterproof rubber stopper can be exerted without damaging a flexible rubber stopper.

According to the present invention, the rubber stopper can be transferred to the discharge portion without changing circumferential directions of a short diameter of the rubber stopper and of a long diameter thereof from the first hole in the supply route. Further, the rubber stopper can be supplied to next process in the same direction from the discharge portion.

According to the present invention, in a condition that the circumferential directions of the short diameter and of the long diameter are kept, the short diameter of the rubber stopper and the long diameter thereof can be reversed in an axial direction as necessary in next process, and can supply the rubber stopper to next process from the discharge portion.

The above and other objects and features of this invention will become more apparent from the following description taken in conjunction with the accompanying drawings.

BRIEF DESCRIPTION OF THE DRAWINGS

FIG. 2A is a perspective view before a shape correction of a rubber stopper;

FIG. 2B is a plan view before the shape correction of the rubber stopper;

FIG. 2C is a plan view after the shape correction of the rubber stopper;

FIG. 2D is a plan view of a condition without the rubber stopper;

FIG. 3A' is a plan view corresponding to the shape of the rubber stopper in FIG. 3A;

FIG. 3B' is a plan view corresponding to the shape of the rubber stopper in FIG. 3B;

FIG. 5A is a plan view of a delivery table;

FIG. 5B is a plan view of a reverse portion;

FIG. 5C is a plan view of a discharge portion;

DESCRIPTION OF THE PREFERRED EMBODIMENT

Figure 1:
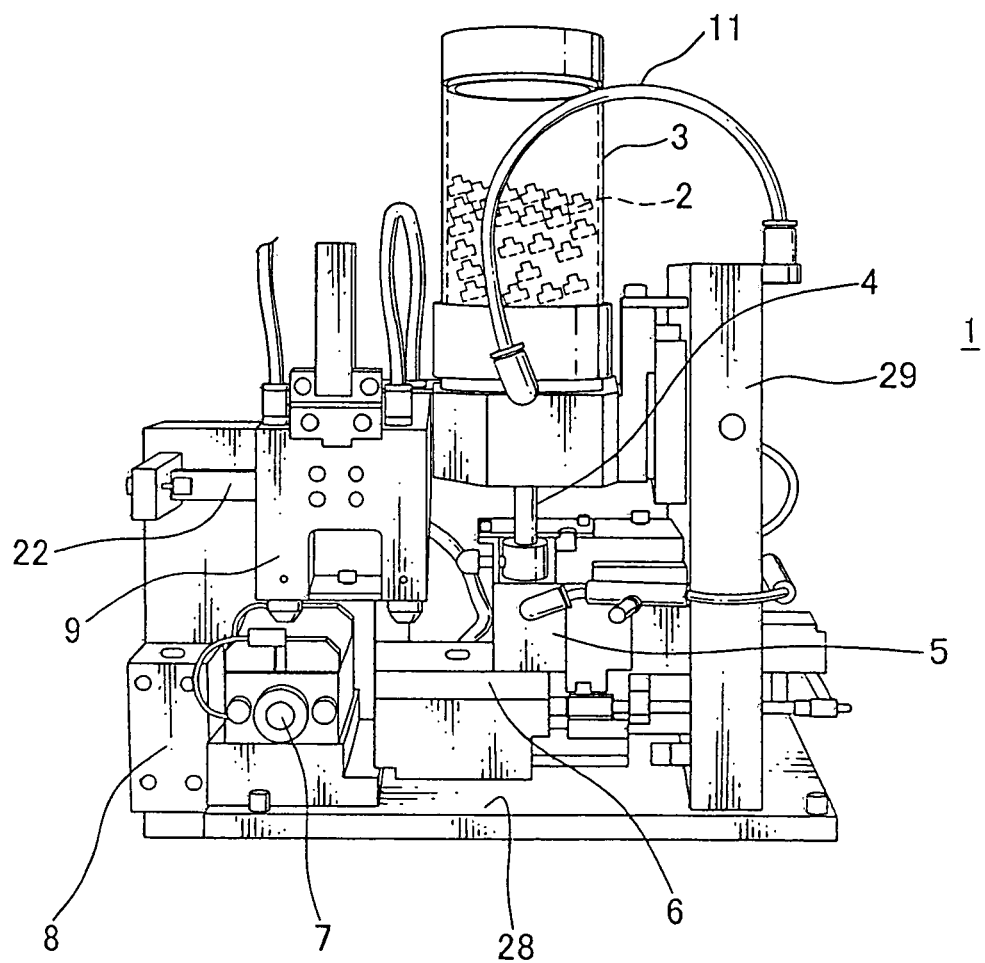
FIG. 1 is a front perspective view showing an embodiment of an elliptic rubber stopper supply device applying to an elliptic rubber stopper supply method of the present invention.

FIG. 1 shows an embodiment of an elliptic rubber stopper supply device, to which a supply method of the elliptic rubber stopper is applied, of the present invention.

The elliptic rubber stopper supply device 1 has a hopper 3, a drop pipe 4, a first rubber stopper corrective portion 5, a delivery table 6, an reverse portion 7 (second corrective portion), a discharge portion 8, a transfer portion 9 and a tube 10. The hopper 3 receives a plurality of waterproof rubber stoppers 2, and formed with synthetic resin and metal. The drop pipe 4 is connected to a bottom portion of the hopper 3 and vertically placed with the bottom up. The drop pipe 4 is made of metal. The first rubber stopper corrective portion 5 is connected to a bottom portion of the drop pipe 4. The delivery table 6, the reverse portion 7 (second corrective portion) and the discharge portion 8 are abreast arranged. The rubber stopper 2 is positioned on a lower side of the first rubber stopper corrective portion 5, and moves from the first rubber stopper corrective portion 5 to the discharge portion 8. The transfer portion 9 is movably arranged in an upper side of the delivery table 6. The transfer portion 9 transfers the rubber stopper 2 to the discharge portion 8 through the reverse portion 7 from the delivery table 6. The tube 10 is connected to a bottom portion of the discharge portion 8, and supplies the rubber stopper 2 to a rubber stopper insertion machine (not shown) of next process.

In a bottom side of the popper 3, an air tube 11 is connected and mixes the rubber stopper 2 with air. Furthermore, the air tube 11 transfers the rubber stopper 2 to the drop pipe 4 from the hopper 3 by moving the air tube up and down. A cross section of the drop pipe 4 is a circular form, and has an inner diameter slightly larger than an elliptic large diameter $2a$ (shown in FIG. 3) of the rubber stopper 2.

The hopper 3 is arranged in an upper side of a base plate 28 through a brace 29. The drop pipe 4 hangs down from the hopper 3. The first rubber stopper corrective portion 5 is connected to a lower side of the drop pipe 4. The delivery table 6 is positioned on the base plate 28 in a lower side of the first rubber stopper corrective portion 5, and horizontally moves. Also, the delivery table 6, the reverse portion 7 and the discharge portion 8 are arranged on the base plate 28 in parallel.

As shown in FIGS. 2A to 2D, the first rubber stopper corrective portion 5 is a main portion of the present invention. The first rubber stopper corrective portion 5 has a rubber stopper receiving space (rubber stopper receiving portion) 13 (hereafter, receiving space 13). The receiving space 13 is arranged on an entrance side of a rubber stopper supply route (hereafter, supply route) in a block 12 made of metal. The rubber stopper receiving space 13 receives rotatably the rubber stopper 2 at a constant angle. A pair of air outlets is formed in an inner wall surface of the receiving space 13 from back and forth of a horizontal direction. Each of the air outlets is connected to an air supply pipe 14.

Figure 2A:
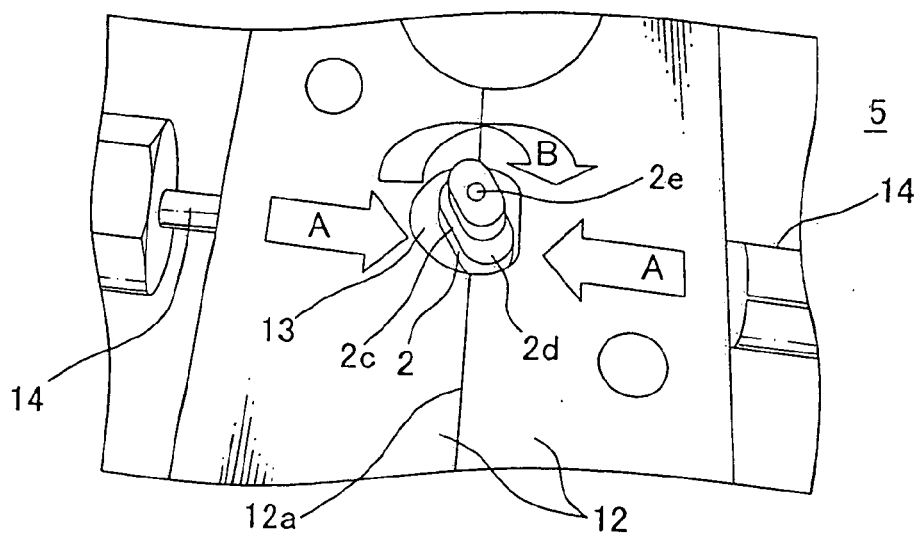
FIGS. 2A, 2B, 2C and 2D show the embodiment of the elliptic rubber stopper supply method.

In condition receiving the rubber stopper 2 into the receiving space 13, air (gas) is intermittently (not continuously but instantaneously) sprayed from both the air outlets to a radial direction of the rubber stopper 2. Thereby, from previous condition correcting the rubber stopper 2 shown in FIG. 2B (in condition that the rubber stopper 2 is inclined), the rubber stopper 2 turns to a radial direction of an arrow B. Then, as shown in FIG. 2C, a long diameter $2c$ of the rubber stopper 2 is corrected to a direction perpendicular to a blowing direction A of air. And, the rubber stopper 2 falls to a first hole (guide hole) 15 of the block 12 in the shape. A cross section of the first hole 15 in lower side thereof is formed into a elliptic shape (oval shape) or rectangle shape. In the corrected shape, the rubber stopper 2 is located on the delivery table 6 (shown in FIG. 5) of a lower side of the block 12. The supply route in the block 12 is formed with the receiving space 13 and the first hole 15.

Figure 2B:
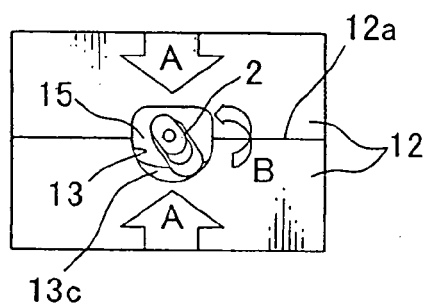
Figure 2C:
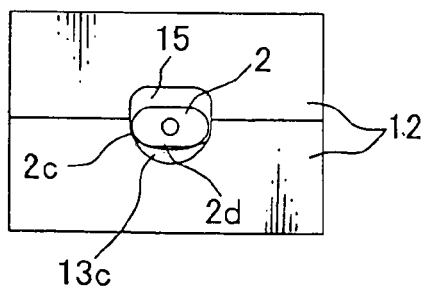
Figure 2D:
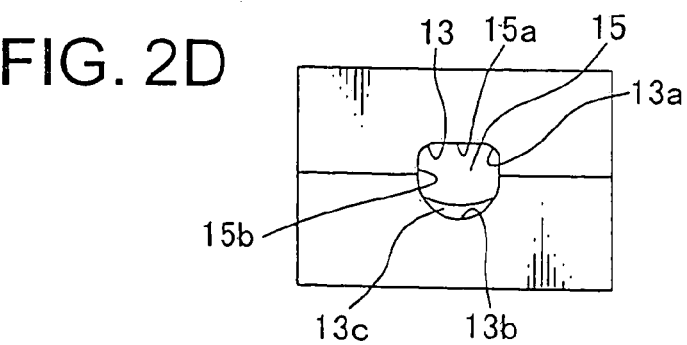

As shown in FIG. 2D (condition without the rubber stopper 2), the receiving space 13 is formed into a deformed circular shape with a rectangle shape and a semicircular. That is, the receiving space 13 includes a rectangular portion $13a$ and a semicircular portion $13b$. As shown in FIG. 2A, an inner wall surface of the rectangular portion $13a$ abuts against a lower surface of a long diameter $2c$ in the robber stopper 2. Thereby, further rotation of the rubber stopper is stopped. In that condition, air is additionally sprayed on both surfaces of the long diameter $2c$ in the rubber stopper 2 from the both sides.

As shown in FIG. 2D, the elliptic first hole 15 is connected to a lower side of the rectangular portion $13a$. An inner surface of the first hole 15 is positioned in plane with the inner wall surface of the rectangular portion $13a$. In a lower side of the semicircular portion $13b$, a shoulder portion $13c$ is arranged. The shoulder portion is formed in a dent shape. In a lower side of the shoulder portion $13c$, the first hole 15 is connected. An inner diameter of a long diameter $15a$ in the first hole 15 is slightly wider than an outer diameter of the long diameter $2c$ in the rubber stopper 2. Also, an inner diameter of a short diameter $15b$ in the first hole 15 is slightly wider than an outer diameter of the short diameter $2d$ in the rubber stopper 2.

In FIG. 2B, one end of the long diameter $2c$ of the rubber stopper 2 abuts on the shoulder portion $13c$. Thereby, the rubber stopper 2 is prevented from falling to the first hole 15. In that condition, air is sprayed from the both side. As a result, as shown in FIG. 2C, a shape of the rubber stopper 2 is corrected, and shapes of the rubber stopper 2 and the first hole 15 are matched. Furthermore, the rubber stopper 2 passes through the first hole 15 and falls thereto. Thereby, the rubber stopper 2 is supplied to the delivery table 6 (shown in FIG. 5). As shown in FIG. 2A, the block 12 is divided from a center of the receiving space 13 and formed (a mark $12a$ shows a divided surface).

Figure 3A:
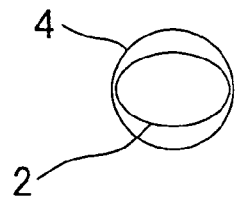
FIG. 3A is a side view showing a shape of the rubber stopper in a drop pipe of the rubber stopper supply device in FIG. 1.
Figure 3B:
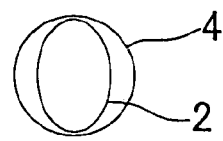
FIG. 3B is a side view showing a shape of the rubber stopper in a drop pipe of the rubber stopper supply device in FIG. 1.
Figure 3A:
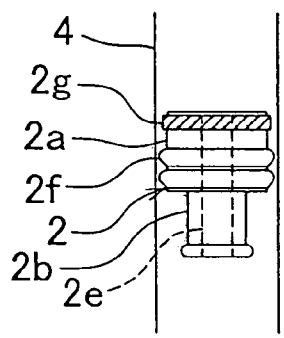
Figure 3B:
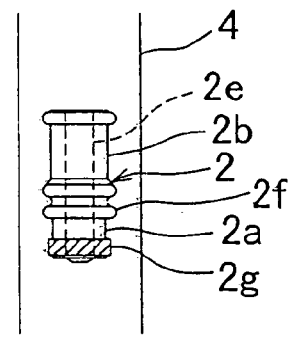

FIGS. 3A and 3B show fall condition of the rubber stopper 2 in the drop pipe 4. A diameter of the drop pipe 4 is bigger than the long diameter $2c$ of the rubber stopper 2. The rubber stopper 2 falls to the drop pipe 4 with a free shape, and is transmitted to the first corrective portion 5 (shown in FIG. 2). The rubber stopper 2 has a circular wire through hole $2e$. The wire through hole $2e$ penetrates to an axial direction. In addition, the rubber stopper 2 has an elliptic hard portion $2g$. The hard portion $2g$ is made of synthetic resin, and located in one end of the long diameter $2c$. A diameter of the hard portion $2g$ is smaller than an outer diameter of a seal lip $2f$.

Figure 4A:
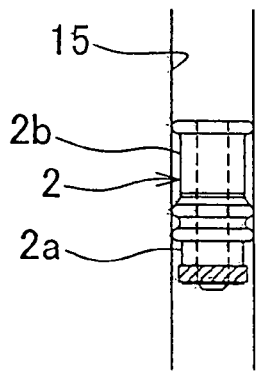
FIG. 4A is a front view showing a shape of the rubber stopper in a rubber stopper corrective portion in FIG. 2.
Figure 4B:
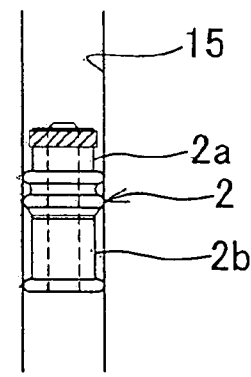
FIG. 4B is a side view showing the shape of the rubber stopper in the rubber stopper corrective portion in FIG. 2.
Figure 4C:
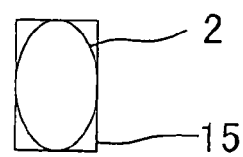
FIG. 4C is a plan view corresponding to the shape of the rubber stopper in FIGS. 4A and 4B.

FIGS. 4A and 4B shows fall condition of the rubber stopper 2 in the first hole 15 of the first corrective portion 5. The rubber stopper 2 falls to the first hole 15 in upward condition (with a small diameter 2b up) or downward condition (with the small diameter 2b up). In the first hole 15, the rubber stopper 2 falls smoothly by adding a part of popping pressure of air (an air relief pressure) in FIG. 2 in addition to self-weight.

The pair of the air outlets in FIG. 2 is slightly offset up and down (in a rubber stopper axial direction) and arranged. Thereby, interference of air flowing out of the air outlets is prevented. (Especially, as shown in FIG. 2B, when a direction of the long diameter of the rubber stopper 2 and a blowing direction of air equate, interference of air tends to take place). Furthermore, shape correction of the rubber stopper 2 is smoothly and steadily performed.

Number of times that air is blown is, for example, about two times per second. By alternately spraying air more than once, the rubber stopper 2 receives air pressure at an outside surface of large area in the short diameter 2d side. Then, the rubber stopper 2 turns within about 180 degrees so at to direct the short diameter 2d to the blowing direction, and is corrected. When air is sprayed from both the air outlets at the same time, pressure in the receiving space 13 is equalized. As a result, its condition becomes similar to condition no blowing air to the rubber stopper 2, and has no effect. Therefore, from a point of protection of the seal lip 2f, preferably, an inner surface of the receiving space 13 comes into contact with the long diameter 2c of the rubber stopper 2. Furthermore, there may be a gap between the inner surface of the receiving space 13 and the long diameter 2c.

Figure 5A:
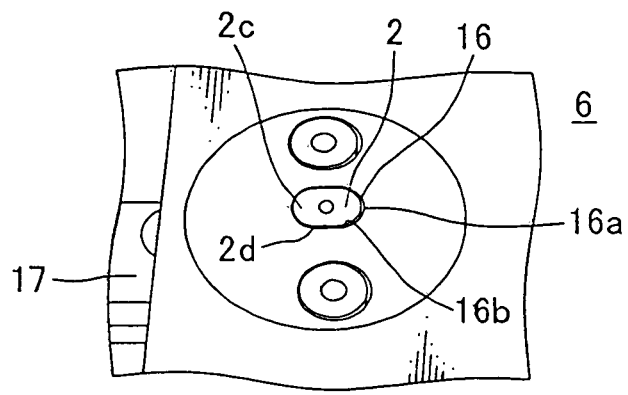
FIGS. 5A, 5B and 5C show process after the rubber stopper corrective portion in FIG. 2.

FIG. 5A shows the delivery table 6 made of metal. A second hole 16 of elliptical shape (oval shape) is arranged on a horizontal upper surface of the delivery table 6. A direction of the second hole 16 is equal to a direction of the first hole 15. The rubber stopper 2 is transferred from the first hole 15 to the second hole 16. Thereafter, the delivery table 6 slides horizontally from a lower side of the corrective portion 5 to the exterior along a horizontal guide rail 17 and become exposed.

In the above condition, air in the rubber stopper 2 of the delivery table 6 is absorbed at the transfer portion 9 in FIG. 6. Then, the rubber stopper 2 of the delivery table 5 is transferred to the reverse portion 7 of FIG. 5B or the discharge portion 8 of FIG. 5C. In the delivery table 6 of FIG. 5A, a direction of the rubber stopper 2 is detected with a sensor (not shown). That is, an upward (the short diameter 2b is the upward direction) or downward direction (the short diameter 2b is the downward direction) is detected. For example, when the rubber stopper 2 is the downward direction, the rubber stopper 2 is transferred to the reverse portion 7. Then, the rubber stopper 2 is reversed in the rubber stopper axial direction with a horizontal rotor 18. Thereafter, the rubber stopper 2 is transferred to the discharge portion 8 with its shape. On the other hand, in the delivery table 6 of FIG. 5A, an upward rubber stopper 2 is directly transferred to the discharge portion 8 of FIG. 5C with the transfer portion 9.

Figure 5B:
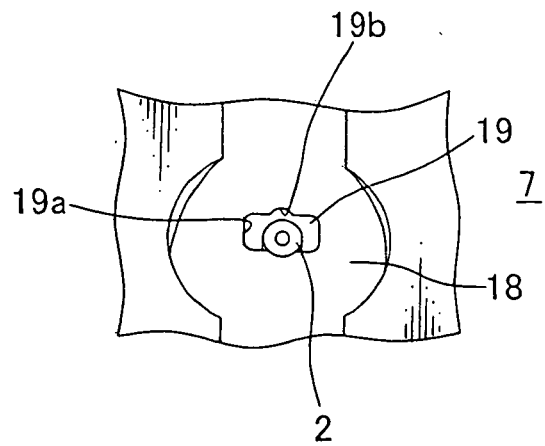

The reverse portion 7 of FIG. 5B includes a fourth hole 19. A cross section of the fourth hole 19 is formed into an elliptical shape or a rectangular shape. The fourth hole 19 passes through the rotor 18 having a horizontal axis (not shown). The rubber stopper 2 is inserted into the fourth hole 19 with the downward direction and held (For example, the seal lip 2f of the long diameter 2a comes into contact with an inner surface of the fourth hole 19). The rotor 18 is reversed with a drive means such as air pressure, and the rubber stopper 2 is corrected in an upward direction. A direction of the fourth hole 19 of the rotor 18 (a direction of the long diameter 19a and the short diameter 19b) is equal to a direction of second hole 16 of the delivery table 6 (a direction of the long diameter 16a and the short diameter 16b).

Figure 6A:
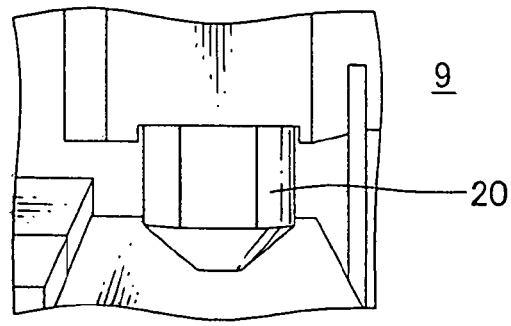
FIG. 6A is a front view showing a transfer portion.
Figure 6B:
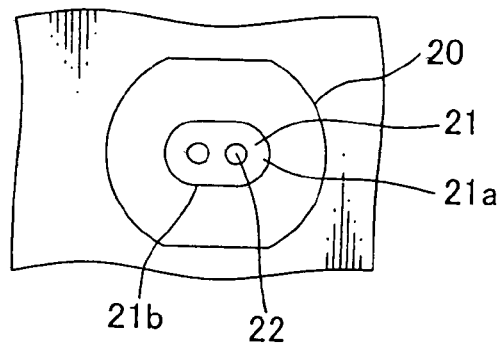
FIG. 6B is a plan view showing the transfer portion.

As shown in FIG. 6B, the transfer portion 9 includes an elliptic receiving hole 21 in a bottom end of a nozzle 20 shown in FIG. 6A. The receiving hole 21 connects to a hole 22. The hole 22 is connected to a compressor (not shown) and absorbs the rubber stopper 2 from the delivery table 6. In this case, preferably, the rubber stopper 2 is lifted by blowing air from bottom up in the delivery table 6. The nozzle 20 moves along a horizontal guide rail 22 (shown in FIG. 1), and goes up and down with an vertical air cylinder. A direction of the hole 21 in the nozzle 20 (a direction of the long diameter 21a and the short diameter 21b) is equal to a direction of the second hole 16 in the delivery table 6 and a direction of the fourth hole 19 in the reverse portion 7.

Figure 5C:
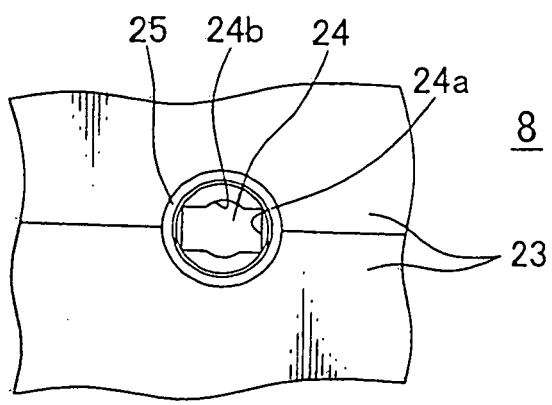
Figure 7A:
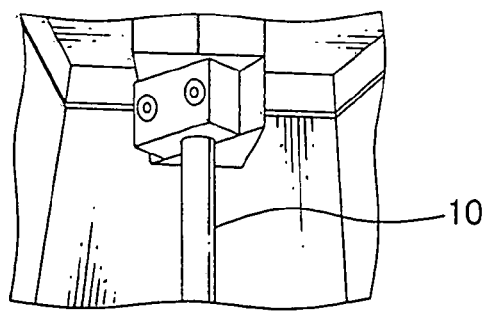
FIG. 7A is a perspective view showing one embodiment of a transfer tube connected to the transfer portion.
Figure 7B:
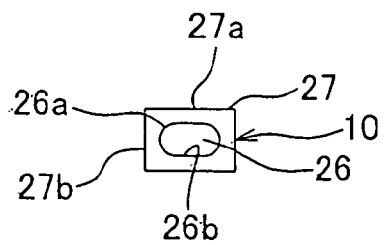
FIG. 7B is a cross section view showing the one embodiment of the transfer tube connected to the transfer portion.
Figure 8:
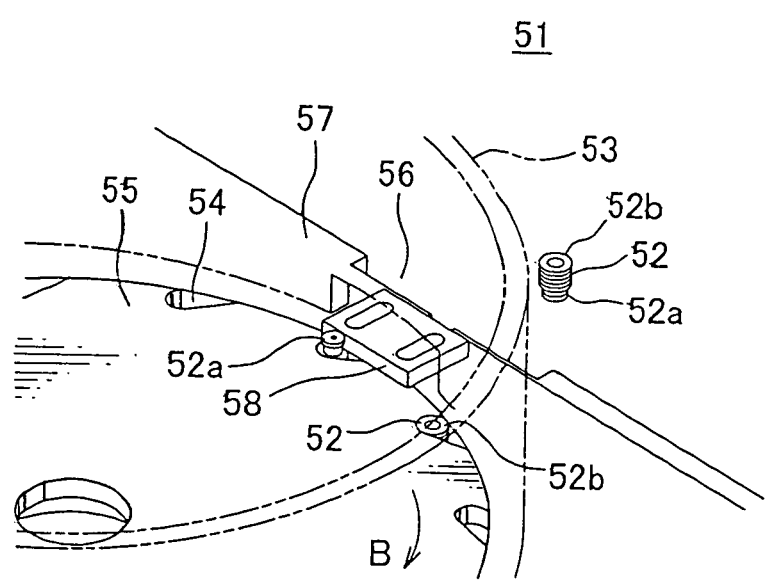
FIG. 8 is a perspective view showing an embodiment of conventional rubber stopper supply device.

The discharge portion 8 of FIG. 5C includes a vertical third hole 24 in a block 23 made of metal. The third hole 24 is formed into a elliptical shape or a rectangular shape, and penetrates through upper and lower surfaces of the third hole 24. A gasket (O-ring) 25 is arranged on an upper end of the third hole 24. On the other hand, a tube 10 shown in FIG. 7 is connected to a lower end of the third hole 24. A dent in a short diameter 24b side of the third hole 24 passes the small diameter 2b of the rubber stopper 2 (the small diameter 2b in the embodiment of the present invention is larger than the short diameter 2d of the large diameter 2a). The dent is formed into an arc shape. Also, the dent 24c is formed in the reverse portion 7. A direction of the third hole 24 in discharge portion 8 (that is, directions of a long diameter 24a and the short diameter 24b) is equal to the direction of the second hole 16 in the delivery table 6 and the direction of the fourth hole 19 in the reverse portion 7.

In condition that the nozzle shown 20 in FIG. 6 is touched to an upper end of the third hole 24 in the discharge portion 8, air in the nozzle 20 is changed from suction to exhaust. Thereby, the rubber stopper 2 is pushed into the third hole 24 of the discharge portion 8 with exhaust air pressure. Thereby, the rubber stopper 2 is transferred (blown) to next process with great force along the tube 10 shown in FIG. 7 from the discharge portion B.

As described above, the rubber stopper 2 is transferred to the delivery table 6, the reverse portion 7 and the discharge portions in series through the corrective portion 5 in FIG. 2 from the drop pipe 4 in FIG. 1. The rubber stopper 2 is supplied to the insertion machine (not shown) at a large distance from the supply device 1 in the same shape through the long tube 10 from the discharge portion 8. More specifically, directions of the long diameter 2c and the short diameter 2d are defined, and the rubber stopper 2 is supplied.

The tube 10 is made of Teflon (registered brand) resin, and has a sliding characteristic. Moreover, the tube 10 can be bent easily. A cross section of a hole 26 which is arranged inside the tube 10 is formed in an elliptical or rectangular shape with a long diameter 26a and a short diameter 26b. The hole 26 of the tube 10 can supply the rubber stopper 2 to an arbitrary position far way from the discharge portion 8 with the same shape.

A shape of an outer circumference surface of a main body 27 in the tube 10 is formed into a rectangular shape with a long side 27a and a short side 27b according to a shape of the elliptic rubber stopper 2. The long diameter 2c of the rubber stopper 2 is located along the long side 27a. Also, the short diameter 2d is located along the short side 27b. Thereby, a worker can know a shape of the rubber stopper 2 simply by looking at an external form of the tube 10. Additionally, in accordance with the shape of the rubber stopper 2, the tube 10 can be efficiently and easily connected to the discharge portion 8 or the insertion machine.

In place of the tube 10 made of Teflon, it is possible to use a tube made of synthetic resin or metal. The tube 10 may be transparent or translucent. Preferably, the tube 10 is transparent so as to check an inside of the tube 10. Furthermore, it is possible to fix material of low friction only to the inner surface of the hole 26 in the tube 26.

The above configuration of the present invention is also useful as an elliptic rubber stopper supply device or supply structure besides the supply method of the elliptic rubber stopper. In FIG. 5, when a direction is not important whether the direction of the rubber stopper 2 is an upper direction or a lower direction, the reverse portion 7 shown in FIG. 5B is able to delete.

The tube 10 of low friction in FIG. 7, for example, can directly connect the tube 10 to the first hole 15 of the corrective portion 5 in FIG. 2, and supply the rubber stopper 2 to next process along the tube 10 by spraying air pressure in the rubber stopper 2 without using the structure of FIG. 5. In addition, the tube 10 in FIG. 7 can be winded in a spiral configuration, extended in a straight shape, and bent. The tube 10 can be applied so as to supply the elliptic rubber stopper 2 to another process from a process with air pressure besides the supply device 1 in FIG. 1.

While, in the embodiment, the present invention is described, it is not limited thereto. Various change and modifications can be made with the scope of the present invention.

What is claimed is:

1. An elliptic rubber stopper supply method comprising the steps of:
    spraying alternately a gas on a rubber stopper which causes the rubber stopper to be corrected in a direction, of which cross section is formed into an elliptical shape, from both sides of a radial direction more than once in a rubber stopper receiving space of a rubber stopper supply route;
    matching a minor axial direction of the rubber stopper to a spraying direction of the gas;
    inserting the rubber stopper into an elliptic first hole connecting to the rubber stopper receiving space in the matching condition.

2. The elliptic rubber stopper supply method as claimed in claim 1, wherein the rubber stopper is inserted into an elliptic second hole of a delivery table from the first hole, and transferred to an elliptic third hole of a discharge portion from the delivery table at a transfer portion.

3. The elliptic rubber stopper supply method as claimed in claim 2, wherein the rubber stopper is transferred to an elliptic fourth hole of a reverse portion from the delivery table at the transfer portion, the rubber stopper is reversed in a rubber stopper axial direction, and the rubber stopper is transferred to the discharge portion at the transfer portion.

4. An elliptic rubber stopper supply device comprising;
    a first shape corrective portion correcting a shape of a rubber stopper of which cross section is formed into an elliptic shape;
    wherein the first shape corrective portion includes a rubber stopper receiving portion arranged on the way of a rubber stopper supply route, and a pair of air outlets spraying alternately and intermittently a gas on both side surfaces of the rubber stopper which causes the rubber stopper to be corrected in a direction;
    wherein the rubber stopper receiving portion has a rectangular portion in one side and a semicircle portion in another side, the semicircle portion connecting to an elliptic hold of the rubber stopper supply route through a shoulder portion provided in a bottom side of the rubber stopper receiving portion;
    wherein one of the air outlets is arranged on the one side of the rubber stopper receiving portion, the other is arranged on the other side thereof, and each the air outlet is offset in a rubber stopper axial direction and located.

5. The elliptic rubber stopper supply device as claimed in claim 4, further comprising a second shape corrective portion having a reverse portion reversing the rubber stopper in an axial direction.

\* \* \* \* \*